(12) United States Patent
Hayes et al.

(10) Patent No.: US 7,801,878 B2
(45) Date of Patent: Sep. 21, 2010

(54) METHOD AND SYSTEM FOR APPROXIMATE MATCHING OF DATA RECORDS

(75) Inventors: Philip J. Hayes, Pittsburgh, PA (US); Eugene Fink, Lutz, FL (US); Ganesh Mani, Pittsburgh, PA (US)

(73) Assignee: Powerloom Corporation, Sewickley, PA (US)

( * ) Notice: Subject to any disclaimer, the term of this patent is extended or adjusted under 35 U.S.C. 154(b) by 1565 days.

(21) Appl. No.: 10/409,150

(22) Filed: Apr. 9, 2003

(65) Prior Publication Data

US 2003/0195836 A1    Oct. 16, 2003

Related U.S. Application Data

(63) Continuation-in-part of application No. 09/737,595, filed on Dec. 18, 2000.

(51) Int. Cl.
*G06F 7/00* (2006.01)
(52) U.S. Cl. ...................................... 707/708
(58) Field of Classification Search ............ 707/6, 707/708
See application file for complete search history.

(56) References Cited

U.S. PATENT DOCUMENTS

| | | | | |
|---|---|---|---|---|
| 5,390,359 A | * | 2/1995 | Damerau | 707/3 |
| 5,546,578 A | * | 8/1996 | Takada | 707/5 |
| 6,026,398 A | * | 2/2000 | Brown et al. | 707/5 |
| 6,523,019 B1 | * | 2/2003 | Borthwick | 706/45 |

\* cited by examiner

*Primary Examiner*—Charles Rones
*Assistant Examiner*—Fazlul Quader
(74) *Attorney, Agent, or Firm*—Miles & Stockbridge P.C.; David R. Schaffer, Esq.

(57) ABSTRACT

The present invention is directed to a method of matching a data record with a reference record. The method includes receiving a data record; searching stored reference records for a reference record that is an exact match for the received data record; and, if an exact matching reference record is not found, calculating a distance between the received data record and at least one stored reference record, and determining the at least one stored reference record to be an approximate match, if the calculated distance is less than a predetermined threshold. The inventive method and system can be used for, but not limited to, invoice processing in an Accounts Payable system, record conciliation in a securities trading system, finding preferred bonds in a bond trading system. Approximate matching records are ranked, and the closest match, or highest ranking match, may be automatically processed, if within a predetermined threshold.

40 Claims, 6 Drawing Sheets

PO Data

|  | PO # | Vendor Name | Total Amount Owed |
|---|---|---|---|
| PO1 | 1234567890 | Bob's Coffee | $4550 |
| PO2 | 1357924680 | Popsicle Heaven | $7005 |
| PO3 | 2468013579 | Sox Shoes Pants | $11075 |

501

Invoices

|  | PO # | Vendor Name | Total Amount Owed |
|---|---|---|---|
| INV1 | 1357924680 | Popsicle Heaven | $7005 |
| INV2 | 1234567890 | Bob's Coffee | $2000 |
| INV3 | 4268013579 | Sox Shoos Pants | $5000 |

502

| Vendor | PO # | Amount |
|---|---|---|
| Greentree Inc. | A67853 | 2,004.57 |
| Greentree Inc. | B58763 | 300.50 |
| Homewood Corp. | A67368 | 415.82 |

METHOD AND SYSTEM FOR APPROXIMATE MATCHING OF DATA RECORDS

CROSS-REFERENCE TO RELATED APPLICATIONS

The present application is a Continuation-In-Part of U.S. patent application Ser. No. 09/737,595, filed Dec. 18, 2000.

FIELD OF THE INVENTION

The present invention generally relates to a computer-based method and system for finding approximate matches for a query. In particular, the system and method of the present invention provides for fine-grained measurement of approximate matches, as well as user control of the manner in which the measurements are made. The present invention provides for automatic processing of approximately matched data records in addition to facilitating more efficient manual processing of inexact matches.

BACKGROUND OF THE INVENTION

The ability to automatically match data records to make electronic transactions is important in today's business world. For example, the New York Stock Exchange (NYSE) and the National Association of Securities Dealers Automated Quotations (NASDAQ) rely on computer systems to automatically match a buyer's "bid" and a seller's "ask" in order to make automatic, real-time transactions. These and other electronic equity exchange platforms have demonstrated the efficiencies that can be acquired through the use of an electronic exchange marketplace that automatically matches the needs of buyers with available market supply in a constantly changing marketplace.

The automatic matching of a buyer's "bid" and a seller's "ask" in the equities market is conceptually simple. By searching through all the orders for a particular stock, it is a matter of finding a bid price that matches an ask price, then ensuring that the number of shares is sufficient to meet the needs of both parties. The deal is consummated and automatically executed.

For most goods and services, however, the "dimensionality" of the buy-sell match problem is much larger—and more complex. A stock has three dimensions—symbol, order size, and price. Orders can be matched knowing only these three pieces of information. For most goods and services, however, more than three dimensions are required to identify the product for a potential buyer or seller. For example, if a person wants to buy a car, he or she needs to know the make, model, year, mileage, transmission-type, options, color and so forth. As each additional dimension is added, the complexity of the trading platform greatly increases. Accordingly, conventional trading platforms are simply not capable of scaling as the number of tradable objects grows exponentially with the number of added dimensions, leading to long response times for the market participants and an inability to process a large number of orders within an acceptable amount of time.

The assignee of the present invention has developed a system that solves the dimensionality problem, as is disclosed in co-pending application U.S. patent application Ser. No. 09/737,595, which is hereby incorporated in its entirety by reference.

In the disclosed system, objects having multiple dimensions are automatically bought and sold over an electronic network. Orders to buy or sell a multi-dimensional object are received by the system. Upon receipt of an order, the system looks for orders already pending in the system that match the order just received. For example, if a sell order is received, the system queries the pending buy orders to find pending buy orders that match the received sell order. Once a received order is matched with a pending order, the system automatically executes the transaction and completes the trade. If the received order is not matched, it is placed in the list of pending orders for future matching.

The disclosed system provides a method for matching orders for multi-dimensional objects by using the received order to define a subset of the market space of pending orders. This subset is the Cartesian product of one-dimensional regions as defined by the received order. Pending orders falling within this subset of the market space are orders containing objects whose dimensions match the parameters defined by the received order.

The disclosed system efficiently and quickly matches complex, multi-dimensional orders thereby facilitating automatic electronic transactions in an electronic marketplace. However, this system can also be used in applications other than an electronic trading platform. The disclosed matching system can be used to query complex records of any type, and can be used in many different types of applications and in many different industries, wherever queries of complex multi-dimensional data are needed. That is, it is not necessary for an electronic transaction to be executed as a result of querying using the disclosed matching system.

As is disclosed in the co-pending application at Page 41, lines 1-9, the disclosed system provides the capability of finding optimal and approximate near-matches. In the context of an electronic trading platform, this near-matching capability provides users with the ability to assess the marketability of orders.

The ability to provide approximate near-matches is important in other contexts as, in addition to the data complexity problem, data is rarely completely perfect. However, it is not enough that an approximate near-match be found—in order to provide maximum usefulness, it should be possible to precisely measure the closeness of the approximate match. For example, in the context of a trading platform, automatic execution of a transaction of a received order and a pending order that does not match the criteria defined by the received order does not make sense. However, if it could be determined that the pending order is close enough to meet specific criteria, it would be advantageous to flag the pending order for further automatic or manual processing to potentially enable a greater number of transactions.

The ability to find and prioritize close matches has many applications outside the arena of electronic marketplaces. For instance, Accounts Payable processing is historically laborious and time-consuming due to the frequent inability to automatically match a company's purchase orders with vendors' invoices. This is due to vendors using different invoice formats, partial shipment invoices, price changes between order and shipment, different interpretations of applicability of discounts, and invoices that refer to multiple purchase orders as well as data entry errors and missing data in vendors' invoices. These types of procedural differences and entry errors create significant exception processing costs. When an invoice cannot be automatically matched with an existing purchase order (PO), the appropriate PO, or multiple POs, that match the invoice must be manually identified and processed. This can involve multiple ad-hoc database queries as an operator applies human intelligence to the detective work of finding potentially matching POs using data from the invoice as clues. Because this process is time-consuming and therefore expensive, the ability to assist the operator by finding POs that closely match the invoice along a variety of dimensions would be very advantageous.

As another example, investment managers and other institutions involved in securities trading have a need to reconcile their own records with those of other counterparties to a trade (such as the execution agent, broker dealer, custodian, etc.) as manifested by messages from those counterparties describing the trade from their own viewpoint. Frequently, errors in transcription or differences in interpretation of a phone conversation lead to discrepancies between the view of an institution and its counterparties. As in the case of PO processing, these discrepancies must typically be manually resolved through ad-hoc database searches. A precisely-controllable approximate matching system would allow many of these discrepancies to be resolved either automatically, or through a facilitated manual process.

As another example, it is difficult to trade municipal bonds online as municipal bonds are brokered through multiple distribution channels prior to reaching retail customers. In addition, the large variety of characteristics or dimensions (such as maturity date, yield, state of issue, etc.) and the large number of available bond issues make finding an appropriate bond for a specific investor a complex task. The ability to match investors' requirements against a collection of available bonds would therefore allow the distribution chain to be streamlined to the advantage of both the issuer and buyer of the bonds. Since, given the complexity of the criteria for specifying a bond, no bond may exactly match the requirements of a particular buyer, the ability to find available bonds that most closely fit the buyer's needs would be very advantageous. Moreover, since the relative importance of different criteria are different for different investors, the ability to precisely control the query such that the most appropriate bonds for that buyer are found in the approximate match process would also be advantageous.

Yet another application area for the present invention is healthcare reconciliation. Records or data generated by a provider of health services, such as a doctor's office or hospital, and by the patient's insurance company must be reconciled with the benefits information associated with the patient. Names may not match exactly, as the patient may not be the insured, but rather an immediate family member of the insured. The amounts are typically different as the insurance company has its pre-determined amount allowed for a procedure, while the provider bills its typical amount. Complex formulas for deductibles may also be involved. It would be advantageous to have a record matching process that could automate the reconciliation task or enhance the productivity of human operators.

In view of the foregoing, it can be appreciated that a substantial need exists for a method and system that can provide real-time, precisely customize controllable approximate matching of imperfect, complex data.

SUMMARY OF THE INVENTION

One embodiment of the invention comprises a method of processing a data record in a matching system. The method comprises receiving the data record; searching stored reference records for a reference record that is an exact match for the received data record; and if an exact matching reference record is not found, calculating a distance between the received data record and at least one stored reference record, and determining the at least one stored reference record to be an approximate match if the calculated distance is less than a pre-determined threshold.

Another embodiment of the invention comprises a method of determining an object distance between a reference record and an incoming record, wherein the reference record has at least one field and the incoming record has at least one field. The method comprises determining correspondence between the at least one field in the reference record to the at least one field in the incoming data record; for each corresponding pair of fields, calculating a field distance; and calculating said object distance by aggregating said field distances.

Another embodiment of the present invention provides for a method of processing invoices in an accounts payable processing system. The method comprises: (a) receiving an invoice; (b) querying a set of purchase orders for a purchase order that matches the received invoice; (c) if a purchase order is found, processing the received invoice and the matching purchase order; (d) if a matching purchase order is not found and a single approximate matching purchase order is found, determining if the single approximate matching purchase order is within an allowable correction threshold, and if so, automatically correcting the single approximate matching purchase order to match the received invoice and processing the received invoice and the corrected matching purchase order; (e) if a matching purchase order is not found and a single approximate matching purchase order is not found, or a single approximate matching purchase order is found but is not within the allowable correction threshold, ranking approximate matching purchase orders found by the query and sending the approximate matching purchase orders to an operator, wherein the operator selects the appropriate approximate matching purchase order as the matching purchase order; and processing the received invoice and the matching purchase order.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the embodiments of the invention, examples of which are illustrated in the accompanying drawings. Wherever possible, the same reference numbers will be used throughout the drawings to refer to the same or like components.

The embodiments of the invention include a matching engine that can continuously query a static or streaming collection of data in real-time in order to perform exact and approximate matching of complex data. The inventive matching engine ranks the matches according to how well the data matches the query, thereby enabling the automatic execution of electronic transactions or other processing based on matching, or nearly matching, data.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

In a database, data is typically stored as records (rows). Each record is a combination of fields (columns). In a conventional database management system, a match is found by querying the data for records that match a certain criteria. The query process compares the fields of each record with the query criteria to determine if the record falls within the criteria. The query identifies the records that match the criteria, and may present these records to the user, or perform further processing on the matching records, such as executing a transaction using the identified records. Records that do not fall within a particular query, but that almost fulfill the query criteria, can only be found by manually constructing a series of subqueries that consider the possible variants of a particular query.

For example, suppose that there are four criteria in a particular query, wherein each criterion in isolation has an acceptable level of variation. It is not sufficient to use a single database query covering the acceptable range of variation for all four because such a query would also find records that differ on all four criteria and are beyond the range of acceptable closeness when considered as a whole. It is instead necessary to construct four separate queries, each allowing the acceptable variation in one criterion. The situation is much more complex if smaller variations on each criterion are acceptable in combination. In the given example, fifteen queries are needed to account for all the one, two, three and four-way combinations of the four criteria. As is obvious to those skilled in the art, the number of possibilities grows exponentially as the number of criteria increases.

This is a computationally-intensive and slow process, and it is not practical to examine all combinations. In current practice, the searching is done with an ad-hoc, error prone, time-consuming and therefore expensive manual search process, relying on human intelligence and intuition. In contrast, the matching engine of the present invention automatically finds approximate matches, taking all combinations of variations along different criteria into account in one matching operation and thereby enabling precisely-controlled automatic approximate matching.

In the inventive method and system, the matching engine finds and ranks records based on their fit within query criteria. In a preferred embodiment, the inventive matching engine automatically finds both exact and approximate matching records. The approximate matches are ranked. This is unlike conventional database management software that only presents or processes records that fall strictly within a query's criteria.

Figure 1:
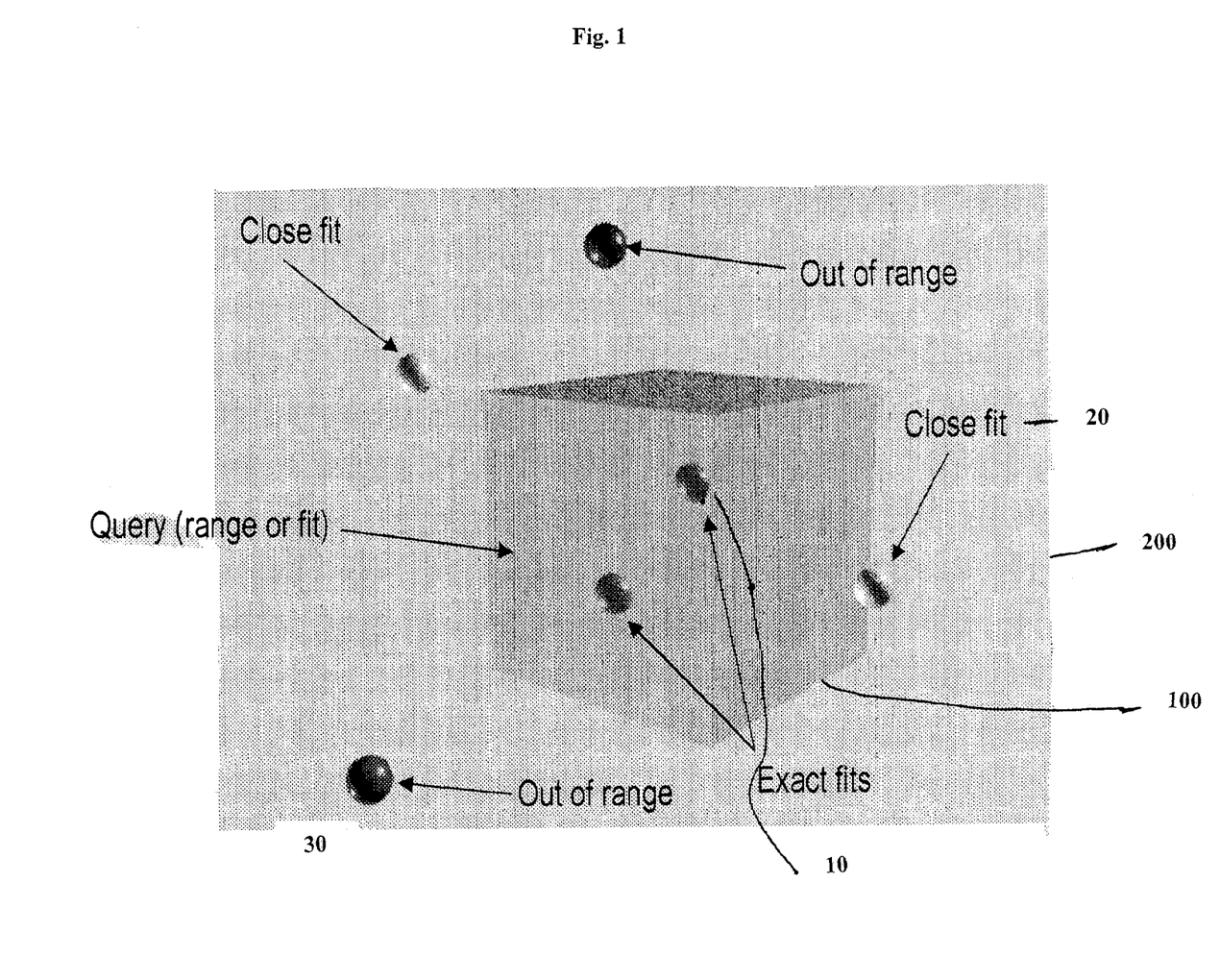
FIG. 1 illustrates out-of-range, near-matches and exact matches of a query of multi-dimensional space.

A query of multi-dimensional data as described in the co-pending application finds records that fall within a multi-dimensional subset 100 of the entire universe of records 200. As shown in FIG. 1, subset 100 may be a Cartesian product of one-dimensional regions. Records that fall within this subset, such as record 10, "match" the query criteria. Record 10 is an exact match for the query represented by subset 100. However, many records, such as record 20, will be close to subset 100, but not exactly match the query criteria. Other records, such as record 30, will fall well outside subset 100.

In the inventive method and system, the measure of how well a record fits within the query criteria is called its "distance". That is, the distance of a record for a query is determined by how close the record comes to falling within the boundaries of the subset defined by the query criteria. If the match is exact, then it is within the boundaries of the subset and the distance is zero. The distance for record 10 for the query shown in FIG. 1, for instance, is zero. The distance indicates whether a record is an exact, close or non-match, and is used to rank the close matches.

The results of a query in the present invention may be ranked based upon distance. That is, a distance for each record is determined, then the records are ranked based on this distance. Obviously, exact matches, or records with a distance of 0, are ranked the highest.

In the context of a collection of records structured as a fixed set of fields, the most common representation of which is a database, the "record distance" refers to how closely a record fits within query criteria. "Record distance" in this context is preferably calculated by determining the distance for each field within a record, and then aggregating these field distances. In one embodiment of the present invention, the field distances may be aggregated by a weighted sum. By weighting fields according to importance or other factor, the aggregated record distance can be precisely controlled to reflect how closely a record meets a query's criteria. As is obvious to one skilled in the art, there are many different methods of aggregating the field distances, including a weighted sum of squares or other polynomial expressions, or non-polynomial expressions.

In the present invention, in addition to weighting field distances when calculating record distance, the calculation of a given field distance may be programmable or user-specified. One of the features of the present invention is that individual field types, such as keyed number or particular alphanumeric strings, may have unique metrics and algorithms for determining the distance of a match for that field. This enables the inventive method and system to match information based on its intended use and meaning. For example, the algorithm for measuring distance for an integer field that represents price data may be defined differently than it is for an integer field that represents keyed data. Multiple field distance functions can be used.

Figure 2:
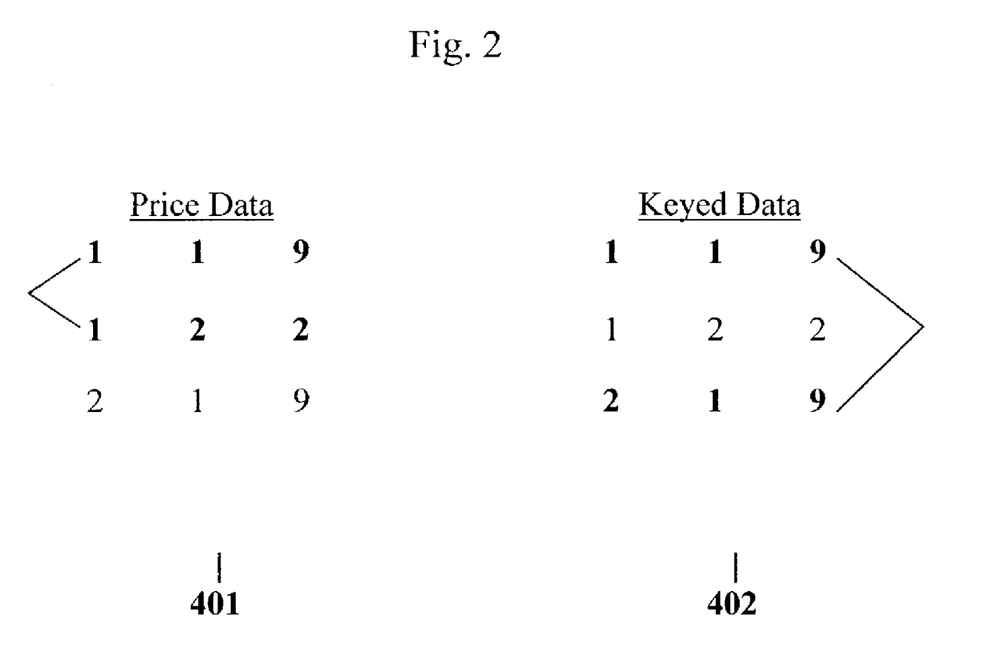
FIG. 2 illustrates an example of programmable measure of field distance.

An example of how individual field metrics and algorithms for measuring field distance may affect the record distance, and therefore the ranking of approximate matches, is shown in FIG. 2. Two datasets 401, 402, each contain three records having a single integer field. In the example shown in FIG. 2, the records in the two datasets have identical values (119, 122, 219). Dataset 401 represents three records of price data, while dataset 402 represents three records of keyed data. While both price data and keyed data in this example are integers, field distance for the price data is measured as the difference in value, while field distance for the keyed data is programmed to consider adjacent digits, skipped digits and swapped digits, all common keying errors.

In the example shown, a query searching for the value "119" is executed. The first record having a value of "119" is the closest match in either dataset, being an exact match, and therefore having a field distance and therefore a record distance of 0. However, the record having a value of "122" has a smaller field distance in the price data dataset 401 than the "219" record (i.e. $119 is closer to $122 than $219), while the record having a value of "219" has a smaller field distance than the "122" record in keyed data dataset 402 (i.e. 2-1-9 is one digit different, while 1-2-2 is two digits different). That is, in this example, the "122" record is ranked as a closer match than the "219" record for price data set 401, while the "219" record is ranked as a closer match than the "122" record in the keyed data set 402.

The queries in the inventive system may be either "immediate" or "persistent". In the immediate query embodiment, a query is similar to an immediate-or-cancel cancel order; that is, the system immediately searches for matches and then removes the query whether or not a match is found. A "persistent" query remains active, and the system continuously searches for matches as new records are added.

In a preferred embodiment, queries in the inventive system are persistent and remain active until termination conditions are met. For example, in the context of an electronic marketplace, an order may remain active until the order is filled. More specifically, unless a pending order is found that matches a new order received by the system, the received order will remain active until another order is received that matches the first received order. Upon finding a match, an electronic transaction is automatically executed, and both orders are fulfilled and removed from the system. As another example of persistent queries, in the context of an Accounts Payable processing system, Purchase Orders are persistent in the system until matching invoices are found.

By allowing persistent queries, an application that uses the matching system of the present invention can "see" every potential fit, in real-time, as data passes through the system. Each record in the inventive system continually checks to see if it is a fit, or close enough fit, for any of the posted queries. As information changes, the results of persistent queries are immediately updated.

The inventive system enables applications using the system to immediately process and act on real-time information. Because the system can make precisely-controlled approximate matches, it allows for automatic processing of some real-time raw or "un-cleansed" data. Without this ability, any data that does not precisely match automatic processing requirements will require offline analysis before it can be processed. The inventive system allows for automatic processing of a constant stream of data from multiple raw, uncleansed data sources without additional offline analysis.

In a preferred embodiment, the inventive system performs real-time reconciliation processing through use of "Reference Data" and "Incoming Data" datasets. "Reference Data" is a dataset in which the records are fully described, and is the data to reconcile against. There is a specific value assigned to each field in each record in the Reference Data. In the inventive system, Reference Data contains known entities that are matched to incoming records or queries—the "Incoming Data". Records in the Incoming Data are to be reconciled against the Reference Data. Records in the Incoming Data dataset may be fully or partially described, and may be less specifically defined than the Reference Data. Incoming Data may also contain errors or variations which need to be resolved successfully if it is to be reconciled with the Reference Data. If a specific value for a field is not present in the Incoming Data, it can be set to a "don't care" or "any" condition or a range.

For example, in a bond trading application using the system of the present invention, the Reference Data may contain bonds available for sale and the Incoming Data may contain requests for bonds from potential buyers. As will be obvious to one skilled in the art, a request for bonds for potential purchase does not have to specifically define one particular bond. There may be a range of bonds that fulfill the user's requirements.

In an Accounts Payable processing application using the system of the present invention, the Reference Data may contain active purchase orders while the Incoming Data contains incoming invoices that need to be paired up with an existing purchase order in order to be processed. As described above, the invoice data frequently has incomplete or incorrect data. The system of the present invention allows for automatic processing of exact matches between purchase orders and invoices, and will find the closest matching purchase orders to unmatched invoices. The application may then be configured to present these closest matching purchase orders to an operator, allowing the operator to select the appropriate purchase order. In addition, if a single approximate match is identified within allowable thresholds, the system of the present invention may automatically correct the invoice or the PO and automatically process this approximate match as if it were an exact match.

The inventive system matches the continuous stream of Incoming Data with Reference Data. The inventive system determines if incoming records "match" by applying distance functions established for each of the fields of a record.

The distance functions include correspondence rules that dictate how a Reference Data record and an Incoming Data record should be related. That is, the correspondence rules pair up fields from the two types of records. For example, in the context of an Accounts Payable application, the correspondence rules determine how the fields of a purchase order coincide with the fields of a payment. This will be discussed in more detail in the Accounts Payable example discussed below.

As discussed above, each field preferably has its own "field distance function" that is used to determine distance for that data field. In a preferred embodiment, the inventive system has a set of predefined field distance functions that can be used for common data types. In addition, new functions can be developed for fields associated with special applications (e.g. credit ratings in bond trading).

To find the distance between two records, the values of the field distance functions for each of the corresponding fields are combined using an aggregation distance function. In a preferred embodiment, the inventive system has a set of predefined aggregation functions that can be used for general purposes. In addition, new aggregation functions can be developed for special application needs as well as by individual users.

The quality of the match is based on how close Reference Data and Incoming Data fields are to each other and the importance of each field relative to each other, as reflected by weights used by the aggregation distance function. An "Approximate Match" is one in which the distance between the two records falls below a hold.

In one embodiment, the system of the present invention uses a digital search tree, preferably a trie, to represent data. As is known to those skilled in the art, a trie is a search tree for storing strings in which there is one node for every prefix of every string. The strings may be stored in extra leaf nodes. Sequences are represented by branches whose nodes correspond to the unique values at any particular point in the sequence. In a preferred embodiment, a compact representation of a trie in which all nodes with a single child are collapsed into a single node, known to those skilled in the art as a PATRICIA tree, is used.

In the trie used by the present invention, each level of the trie corresponds to a field of the data. In a PATRICIA tree, several fields can be collapsed into a single node. The differences between records are represented by branching of the trie. To make the search efficient, various optimizations may be applied to the tries so that at any given level, there will often be fewer branches than the number of distinct values in the field represented by that level. Levels may also be collapsed together for further efficiency.

Figure 6A:
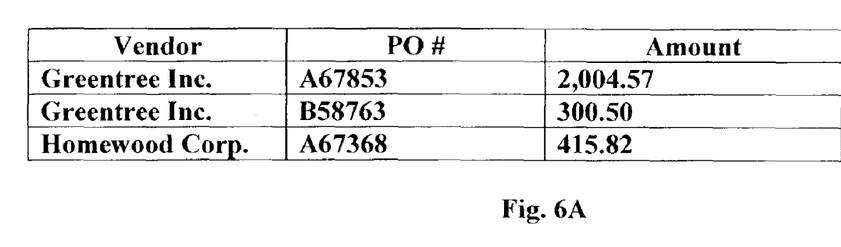
FIG. 6 illustrates a trie representation of data in the system of the present invention.
Figure 6B:
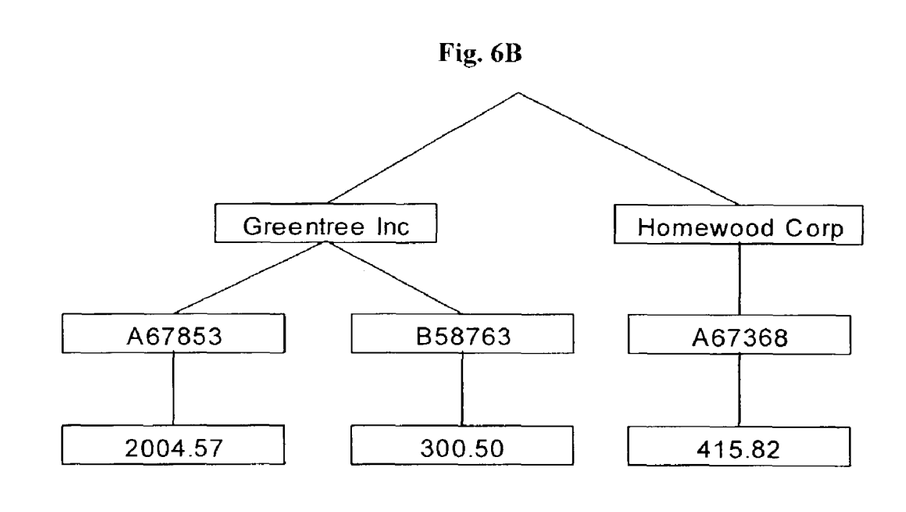

FIG. 6 illustrates an example of how records used in an Accounts Payable processing application of the matching engine of the present invention may be stored in a trie. As shown in FIG. 6A, there are three records in this example, each record comprised of three fields, vendor name, PO number and Amount. FIG. 6B illustrates the trie data representation of the records shown in FIG. 6A.

The tree representation used by the matching engine of the present invention is preferably optimized to provide for efficient search and retrieval of exactly and approximately matching records by searching as small a portion of the tree as possible. The amount of the tree searched during approximate matching will be determined by the maximum distance specified as acceptable for a record to be considered as approximate match. If no limit is placed on the acceptable distance, the whole tree may be searched. The searching is further optimized by maintaining information about the fields further down the tree at intermediate nodes of the tree. In addition, the children of each PATRICIA tree node may be indexed within the node by a dictionary structure, such as a red-black tree. Binary search trees, unbalanced binary search trees, hash tables, sorted unsorted lists, splay trees and other structures known to those skilled in the art may be used, and are also intended to come within the scope of the present invention. Those skilled in the art will appreciate that other methods may be used to provide for efficient tree searching, such as range trees, k-d trees, quadtrees, PR trees, R-trees or R*-trees for numeric fields with a large number of possible values.

A "query" as used in the present invention is simply a record that may be either completely or partially specified. Field distance is computed for each field of the record, using field-specific methods. The record distance for the record as a whole is computed by aggregating across all fields. Different weights may be given to different fields in the aggregation process. Matching involves stepping down the tree computing distance for each field (i.e. at each level of the tree) and aggregating as specified.

Exact matches are found by searching the tree in a depth-first manner to find a branch that matches the query data. Approximate matches are found using a best-first or iterative-deepening search. In one embodiment, the search finds all approximate matches within a given distance threshold. Not only can limits be imposed on the maximum approximate-match distance, but the maximum number of approximate matches can also be limited. In another embodiment, the search finds a specified number of approximate matches that are all within a certain factor of the closest distance. However, by doing so, a trade-off between a guarantee of finding all closest matches is made for matching speed. In this embodiment, the approximate matches are not guaranteed to be the optimal set of close matches for that number of matches. The distance threshold, factor controlling the trade-off between speed and optimality, field and record distance functions and optional limits on the maximum number of approximate matches is preferably included and stored with the query.

Figure 4:
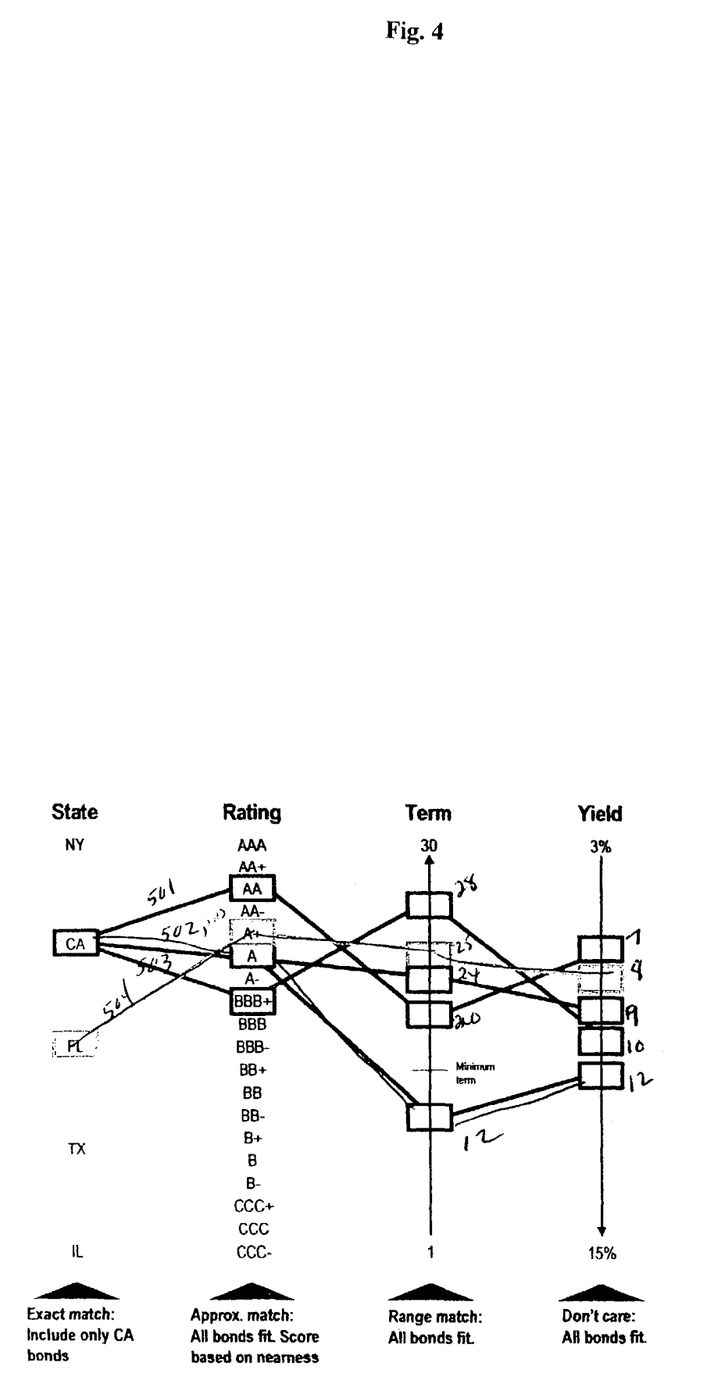
FIG. 4 illustrates a bond trading application using the inventive matching system to match requests for bonds with available bonds for sale.

An example of an application using the system of the present invention is shown in FIG. 4. In the bond trading system example shown in FIG. 4, a potential buyer is only interested in purchasing municipal bonds based in California that have a term of 15-30 years. In addition, the potential buyer would prefer that the bonds have a credit rating of "A". The buyer does not care about yield in this example. This information will make up the Incoming Data in a query. The system of the present invention will search the Reference Data, or database of bonds actively available for sale, for bonds that match the hard constraints (state and term in this example), and rank them based on the potential buyer's other preferences.

In the example shown in FIG. 4, the Reference Data consists of the bond 501, which is a California bond rated AA, having a term of 20 years and a yield of 7%; bond 502 which is a California bond rated A having a term of 24 years and a yield of 9%; bond 503 which is a California bond rated BBB+ having a term of 28 years and a yield of 10%, bond 504 which is a Florida bond rated A+ having a term of 25 years and yield of 8%, and bond 505, which is a California bond rated A having a term of 12 years and a yield of 12%.

In this example, since the user has hard constraints for the state of issue and the term of the bond, these fields have distance functions for which anything other than an exact match counts as an infinite distance. This means that an approximate match will never include state of issue and term fields that are not exact matches as the infinite distance resulting from the discrepancy in these fields will exceed any closeness limit that can be specified.

As the buyer desires only California bonds, bond 504 is excluded as a non-match (i.e. the distance for bond 504 will be infinite). As the available range for the term of a matching bond is 15 to 30 years, bond 505 is also excluded as a non-match. The remaining bonds in the Reference Data are then ranked on how close they match the buyer's query in the Incoming Data. Bond 501 does not have an A ranking, but its AA rating is close. Bond 503 likewise has a close rating of BBB+. Bond 502 matches the buyer's query exactly with a rating of A. If the bonds are ranked only on this requirement, bond 502 will show up as the highest ranking match. However, the buyer may be interested in bonds 501 and 503 as they have differing terms and yield rates. The system of the present invention can be configured to rank bond 502 as the highest, as its rating matches the user's query for "A" bonds, or the system can be configured to consider the values of the other fields when calculating the distance for these matches. For example, if a longer term is more important to the potential buyer, the distance for bond 503 may be smaller than the distance for bond 502, and therefore may be the highest ranking match.

Figure 3:
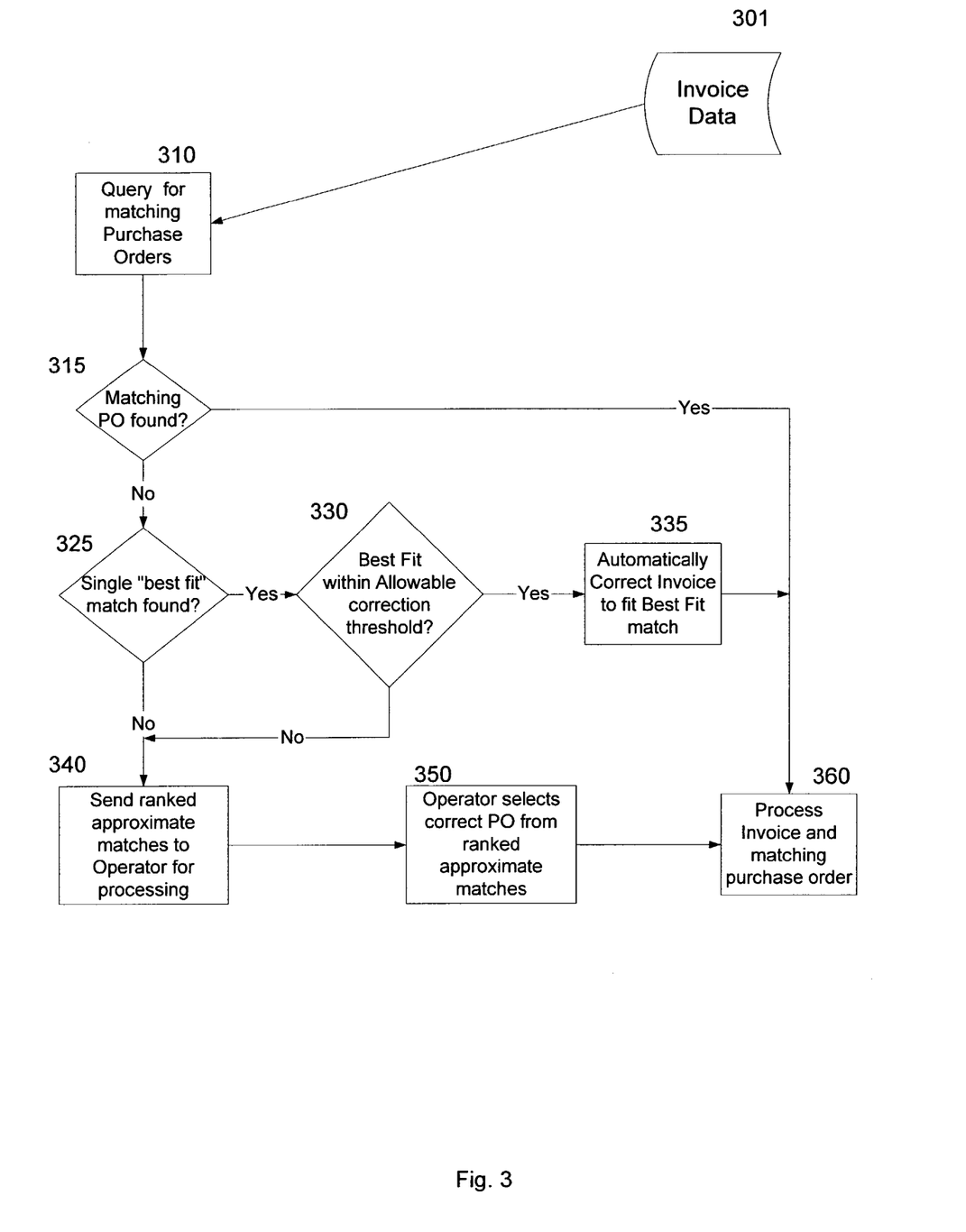
FIG. 3 illustrates the flow of purchase order/invoice processing data using the system of the present invention.
Figure 5:
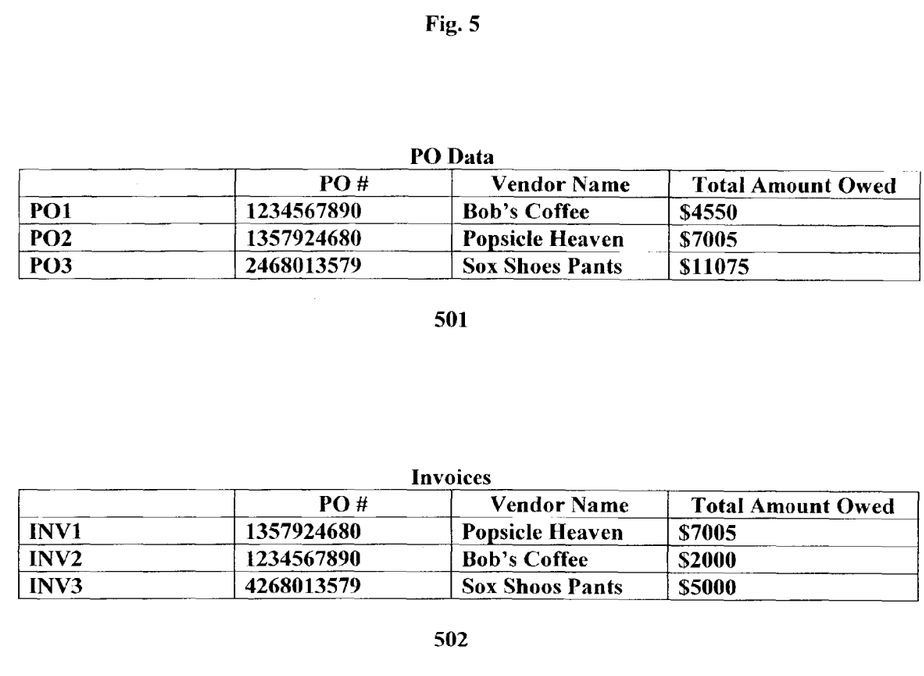
FIG. 5 illustrates an example of exact and approximate matches in an Accounts Payable application using the inventive system.

FIGS. 3 and 5 illustrate how the system of the present invention could potentially be used in an Accounts Payable processing application. In Accounts Payable (AP) processing, a constant stream of potentially thousands of invoices must be matched with purchase orders and contracts. Entry errors create significant exception processing costs. In fact, most AP processing costs are driven by exceptions that must be resolved by skilled operators.

FIG. 3 illustrates the basic AP processing steps in one embodiment of an AP processing system that uses the inventive matching system. As shown by block 301, the Incoming Data in this example comprise invoices 301. As invoices enter the system, the Reference Data, or Purchase Orders in this example, are queried for matches at step 310. In this case, the incoming invoices act as queries. Typically, a Purchase Order (PO) will match an invoice if there is a PO number referenced in the invoice that matches the PO number associated with a PO in the system. If an exact match is found, the invoice and matching Purchase Order are automatically processed at step 360.

FIG. 5 illustrates how the AP application could advantageously utilize the approximate matching capability of the present invention. In this example, Reference Data is shown in Table 501, which shows the active (unmatched) Purchase Orders in the system. Incoming Data is shown in Table 502, which shows invoice data as it comes into the system. In this example, the correspondence rules have established that the Purchase Order number in the Reference Data corresponds with the Purchase Order number in the Incoming Data. The Vendor Name in the Reference Data corresponds with the Vendor Name in the Incoming Data. The Total Amount Owed field in the Reference Data corresponds to the Amount Submitted field in the Incoming Data.

In the example shown in FIG. 5, PO2 exactly matches INV1, because all corresponding fields are exactly the same. PO1 is an approximate match for INV2, because they only differ in the Total Amount Owed/Amount Submitted fields. PO3 is an approximate match for INV3, differing in two fields with a very close match in one of them (PO number). A measure of the distance between INV3 and PO3 is therefore likely to be relatively small.

As demonstrated by the Example in FIG. 5, when exceptions are encountered, such as an entry error, exactly matching POs may not be found, and the system attempts to find approximate matches. As shown by step 325, if a single "best fit" match is found, the system may attempt to correct this best-fitting PO such that it matches this invoice, or alternatively, correct the invoice to match this best-fitting PO. As shown by step 330, the system may be configured to consider certain correction thresholds when attempting to correct the best fitting PO to match the invoice. For example, the system may be configured such that the correction will be made automatically when the difference in dollar values is less than a certain value, corresponding to the estimated cost of processing the exception manually.

If the best fitting PO is within the correction threshold parameters, this PO is automatically corrected to match the invoice at step 335. If the best fitting PO match is outside the correction threshold, the process will revert back to the basic exception handing process with step 340. It should be obvious to one skilled in the art that steps 325 and 330 are optional. In another embodiment, if an exactly matching PO is not found at step 315, the process could continue to step 340 at that point.

At step 340, the system handles manual exception processing. Distances for the closest matches are calculated, and the approximate matches are ranked and sent to an operator for further processing. Preferably, the ranked approximate matches are shown to the operator for easy selection of the correct PO for the current invoice at step 350. By providing precisely-controlled ranking of approximate matches, the inventive system reduces the amount of manual processing that must take place to process most exceptions. Finally, the operator-selected PO and the current invoice are processed at step 360.

There is a need for a matching system that can find precisely-controlled near-matches. The system and method of the present invention provides such a matching system, such that applications using the inventive system can perform automatic processing using these approximate matches.

Although various embodiments are specifically illustrated and described herein, it will be appreciated that modifications and variations of the present invention are covered by the above teachings and within the purview of the appended claims without departing from the spirit and intended scope of the invention. For example, although the embodiments of the invention implement the functionality of the processes described herein in software, it can be appreciated that the functionality of these processes may be implemented in hardware, software, or a combination of hardware and software using well-known techniques. A computer readable medium can be used to store software instructions for carrying out an embodiment using a computer. The computer-readable medium can include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), and optical disk (e.g., CD-ROM).

The invention claimed is:

1. A computer-implemented method of matching a data record with one of a plurality of reference records in a system, the computer-implemented method embodied as executable computer program instructions stored on a computer-readable medium that, when executed by a processor in a computer, match the data record with one of the plurality of reference records, the computer-implemented method comprising:

(A) receiving the data record in to a memory in the computer via an I/O adaptor;

(B) retrieving a reference record from the plurality of reference records that is closest to the received data record, using an indexing tree that combines all field-level distances with secondary indexing and a best-first search algorithm for identifying matches between the received data record and the reference record and conditionally reconciling data within the received data record with data in the reference record, and then calculating an application-specific, predefined distance between the received data record and the retrieved reference record; and (C) determining that the reference record approximately and sufficiently for the specific application, matches the received data record, if the calculated distance is less than or equal to a selectable application-specific threshold, wherein the reference record is determined to exactly match the received data record when the calculated distance is zero;

repeating steps (B) and (C) until a reference record is determined to either exactly match the received data record, or until a predetermined maximum number of reference records have been determined to approximately match the received data record;

(D) ranking from closest to farthest the reference records that were determined to approximately match the received data record by the calculated distance;

(E) if only one reference record is found that exactly matches the received data record, performing automatic processing on the exact matching reference record and the received data record and outputting a result of the automatic processing; and (F) if only one reference record is determined to be ranked as a top approximate match for the received data record, and if the top-ranked approximately matching reference record is within a predefined automatic processing threshold defining what is close enough, performing the automatic processing on the reference record and the received data record and outputting a result of the automatic processing, wherein if no reference records are determined to exactly match the received data record, and no reference records are determined to approximately match the received data record, storing the received data record as a persistent query.

2. The computer-implemented method of claim 1, wherein the system is an accounts payable (AP) processing system, the received data record is an invoice, and the stored reference records are purchase orders.

3. The computer-implemented method of claim 1, wherein if the top-ranked approximately matching reference record is within the predefined automatic processing threshold, correcting the top-ranked approximately matching reference record to match the received data record before automatically processing the corrected reference record and the received data record.

4. The computer-implemented method of claim 1, wherein the matching system is a financial instrument trading system, and the received data record is a financial instrument buy order or request, and the stored reference records are corresponding financial instruments sell orders available for purchase.

5. A computer-readable medium containing executable instructions that upon execution by a processor in a computer cause the computer to process a data record in a matching system, said medium comprising:
   a storage section for storing a plurality of data records in communication with a processor in a computer;
   a first code section containing instructions that upon execution by the processor cause the computer to receive the data record;
   a second code section containing instructions that upon execution by the processor cause the computer to retrieve a reference record closest to the received data record, using an indexing tree that combines all field-level distances with secondary indexing and a best-first search algorithm for identifying matches between the received data record and the reference record and conditionally reconciling data within the received data record with data in the reference record, and then calculate an application-specific, predefined distance between the received data record and the retrieved reference record; and
   a third code section containing instructions that upon execution by the processor cause the computer to determine that the reference record approximately and sufficiently for the specific application, matches the received data record, if the calculated distance is less than or equal to a selectable application-specific threshold;
   a fourth code section that contains instructions that upon execution by the processor cause the computer to repeat instructions in the second code section and third code section until a reference record is determined to either exactly match the received data record, or until a predetermined maximum number of reference records have been determined to approximately match the received data record;
   a fifth code section containing instructions that upon execution by the processor cause the computer to rank from closest to farthest the reference records that were determined to approximately match the received data record by the calculated distance;
   a sixth code section containing instructions such that upon execution by the processor, if only one reference record is found that exactly matches the received data record, cause the computer to perform automatic processing on the exact matching reference record and the received data record and output a result of the automatic processing; and
   a seventh code section containing instructions such that upon execution by the processor, if only one reference record is determined to be ranked as a top approximate match for the received data record, and if the top-ranked approximately matching reference record is within a predefined automatic processing threshold defining what is close enough, cause the computer to perform the automatic processing on the reference record and the received data record and output a result of the automatic processing
   wherein if the top-ranked approximately matching reference record is within a predefined automatic processing threshold, additionally comprising a ninth code section containing instructions that upon execution by the processor cause the computer to correct the top-ranked approximately matching reference record to match the received data record and automatically process the corrected reference record and the received data record.

6. The computer-readable medium of claim 5, wherein said third code section additionally contains instructions that upon execution by the processor cause the computer to determine that the reference record exactly matches the received data record, if the calculated distance is zero.

7. The computer-readable medium of claim 6, wherein if no reference records are determined to exactly match the received data record, and no reference records are determined to approximately match the received data record, an eighth computer code section containing instructions that upon execution by the processor cause the computer to store the received data record as a persistent query in the storage section.

8. The computer-readable medium of claim 5, wherein the system is an accounts payable processing system, the received data record is an invoice, and the stored reference records are purchase orders.

9. The computer-readable medium of claim 5, wherein, if the top-ranked approximately matching reference record is within a predefined automatic processing threshold, additionally comprising a tenth code section containing instructions that upon execution by the processor cause the computer to correct the received data record to match the top-ranked approximately matching reference record and automatically process the corrected received data record and the top-ranked approximately matching reference record.

10. The computer-readable medium of claim 9, wherein the matching system is a financial instrument trading system, and the received data record is a financial instrument buy order or request, and the stored reference records are corresponding financial instruments sell order available for purchase.

11. A computer-implemented method of determining a record distance between a reference record and an incoming record, wherein the reference record has at least two fields and the incoming record has at least two fields, the computer-implemented method embodied as executable computer program instructions stored on a computer-readable medium that, when executed by a processor in a computer, match the data record with one of the plurality of reference records, the computer-implemented method comprising:
   (A) determining correspondence between each of the two fields in the reference record and a field in the incoming data record using an indexing tree that combines all field-level distances with secondary indexing and a best-first search algorithm for identifying matches between the received data record and the reference record and conditionally reconciling data within the incoming data record with data in the reference record;

(B) for each corresponding pair of fields determined in step (A), calculating an application-specific, predefined field distance between each corresponding pair of fields;

(C) calculating said record distance by aggregating said application-specific, predefined field distances; and (D) ranking from closest to farthest the reference record with other reference records determined to approximately match the received data record by the calculated record distance;

(E) if only one reference record is found that exactly matches the received data record, performing automatic processing on the exact matching reference record and the received data record and outputting a result of the automatic processing; and (F) if only one reference record is determined to be ranked as a top approximate match for the received data record, and if the top-ranked approximately matching reference record is within a predefined automatic processing threshold defining what is close enough, performing the automatic processing on the reference record and the received data record and outputting a result of the automatic processing, wherein said reference record is a persistent query and wherein if a calculated record distance is zero, the reference record and the incoming record match.

12. The computer-implemented method of claim 11, wherein step (C) additionally comprises:
(i) totaling each field distance determined in step (B).

13. The computer-implemented method of claim 11, wherein step (B) additionally comprises:
(i) for each corresponding pair of fields determined in step (A), calculating a field distance and weighing the calculated field distance by a field-specific predetermined weight to calculate a weighted field distance.

14. The computer-implemented method of claim 13, wherein step (C) additionally comprises:
(i) totaling each weighted field distance determined in step (B)(i).

15. The computer-implemented method of claim 14, wherein step (C)(i) additionally comprises totaling each weighted field distance determined in step (B) using a weighted sum of squares function.

16. The computer-implemented method of claim 11, wherein said field distance is calculated using a field distance function.

17. The computer-implemented method of claim 16, wherein a field distance function is defined for each corresponding pair of fields.

18. The computer-implemented method of claim 17, wherein at least one field distance function is predefined.

19. The computer-implemented method of claim 17, wherein at least one field distance function is user-defined.

20. A computer-readable medium having embodied thereon a plurality of computer program instructions that, when executed by a processor, perform a method for determining a record distance between a reference record and an incoming record, wherein the reference record has at least two fields and the incoming record has at least two fields, said computer program instructions comprising:

a first code section containing instructions that cause the computer to determine correspondence between each of the two fields in the reference record and one of the at least two fields in the incoming data record using an indexing tree that combines all field-level distances with secondary indexing and a best-first search algorithm for identifying matches between the received data record and the reference record and conditionally reconciling data within the incoming data record with data in the reference record;

a second code section containing instructions that cause the computer to calculate an application-specific, predefined field distance for each corresponding pair of fields; and a third code section containing instructions that cause the computer to calculate said record distance by aggregating said application-specific, predefined field distances; and a fourth code section containing instructions that cause the computer to rank from closest to farthest the reference record with other reference records determined to approximately match the received data record by the calculated record distance;

a fifth code section containing instructions that cause the computer to, if only one reference record is found that exactly matches the received data record, perform automatic processing on the exact matching reference record and the received data record and output a result of the automatic processing; and a sixth code section containing instructions that cause the computer to, if only one reference record is determined to be ranked as a top approximate match for the received data record, and if the top-ranked approximately matching reference record is within a predefined automatic processing threshold defining what is close enough, perform the automatic processing on the reference record and the received data record and output a result of the automatic processing, wherein if the top-ranked approximately matching reference record is within the predefined automatic processing threshold, correcting the new reference record to match the received data record before automatically processing the new reference record and the received data record and outputting the result of the automatic processing.

21. The computer-readable medium of claim 20, wherein said reference record is a persistent query.

22. The computer-readable medium of claim 20, wherein said third code section additionally contains instructions that cause the computer to total each calculated field distance.

23. The computer-readable medium of claim 20, wherein said second code section additionally contains instructions that cause the computer to calculate weighted field distance by calculating a field distance for each corresponding pair of fields, and weighting the calculated field distance by a field-specific predetermined weight.

24. The computer-readable medium of claim 23, wherein said third code section additionally comprises instructions that cause the computer to total each weighted field distance.

25. The computer-readable medium of claim 24, wherein said third code section additionally comprises instructions that cause the computer to total each weighted field distance determined using a weighted sum of squares function.

26. The computer-readable medium of claim 20, wherein said second code section contains instructions that cause the computer to calculate the field distance using a field distance function.

27. The computer-readable medium of claim 26, wherein the field distance function used by the second code section is separately defined for each corresponding pair of fields.

28. The computer-implemented method of claim 1, further comprising:
if the top-ranked approximately matching reference record is within the predefined automatic processing threshold, correcting the received data record to match the new reference record before automatically processing the new reference record and the received data record and outputting the result of the automatic processing.

29. The computer-implemented method of claim 1, wherein the persistent query continuously searches each new reference record added to the system to determine whether a new reference record and the data record in the persistent query exactly match or match within the predefined automatic processing threshold, and if either match is made, automatically processing the new reference record and the data record in the persistent query and outputting a result of the automatic processing.

30. The computer-implemented method of claim 29, further comprising:
   if the new reference record and the data record in the persistent query match within the predefined automatic processing threshold, correcting the new reference record to match the data record in the persistent query before automatically processing the new reference record and the data record in the persistent query and outputting the result of the automatic processing.

31. The computer-implemented method of claim 29, further comprising:
   if the new reference record and the data record in the persistent query match within the predefined automatic processing threshold, correcting the data record in the persistent query to match the new reference record before automatically processing the new reference record and the data record in the persistent query and outputting the result of the automatic processing.

32. The computer-implemented method of claim 1, wherein calculating the application specific, predefined distance comprises:
   calculating the application specific, predefined distance using the indexing tree and search algorithm in which at least the reference record is stored.

33. The computer-readable medium of claim 5, wherein if the top-ranked approximately matching reference record is within the predefined automatic processing threshold, the seventh code section further contains instructions to correct the received data record to match the top-ranked approximately matching reference record before automatically processing the corrected received data record and the top-ranked approximately matching reference record.

34. The computer-readable medium of claim 5, wherein if the top-ranked approximately matching reference record is within the predefined automatic processing threshold, the seventh code section further contains instructions to correct the top-ranked approximately matching reference record to match the received data record before automatically processing the received data record and the corrected top-ranked approximately matching reference record.

35. The computer-readable medium of claim 7, wherein the eighth code section further contains instructions to cause the computer to continuously search each new reference record added to the system to determine whether a new reference record and the data record in the persistent query exactly match or match within the predefined automatic processing threshold, and if either match is made, automatically process the new reference record and the data record in the persistent query and output a result of the automatic processing.

36. The computer-readable medium of claim 35, wherein the eighth code section further contains instructions to cause the computer to, if the new reference record and the data record in the persistent query match within the predefined automatic processing threshold, correct the new reference record to match the data record in the persistent query before automatically processing the new reference record and the data record in the persistent query and outputting the result of the automatic processing.

37. The computer-readable medium of claim 35, wherein the eighth code section further contains instructions to cause the computer to, if the new reference record and the data record in the persistent query match within the predefined automatic processing threshold, correct the data record in the persistent query to match the new reference record before automatically processing the new reference record and the data record in the persistent query and outputting the result of the automatic processing.

38. The computer-implemented method of claim 1, wherein using an indexing tree that combines all field-level distances with secondary indexing further comprises:
   using an indexing tree that combines all field-level distances with secondary indexing by pre-defined sets of field values.

39. The computer-implemented method of claim 38, wherein using an indexing tree that combines all field-level distances with secondary indexing by pre-defined sets of field values further comprises:
   using an indexing tree that combines all field-level distances between corresponding fields in the reference record and the data record with secondary indexing by pre-defined sets of field values.

40. The computer-implemented method of claim 1, wherein using an indexing tree that combines all field-level distances with secondary indexing further comprises:
   using an indexing tree that combines all field-level distances between corresponding fields in the reference record and the data record with secondary indexing.

* * * * *